United States Patent
Lallouet et al.

(10) Patent No.: US 8,373,066 B2
(45) Date of Patent: Feb. 12, 2013

(54) ELECTRICAL FEEDTHROUGH STRUCTURE FOR SUPERCONDUCTOR ELEMENT

(75) Inventors: Nicolas Lallouet, Fiennes (FR);
Sébastien Delplace, Loon-Plage (FR);
Pierre Mirebeau, Villebon S/Yvette (FR)

(73) Assignee: Nexans, Paris (FR)

( * ) Notice: Subject to any disclaimer, the term of this patent is extended or adjusted under 35 U.S.C. 154(b) by 794 days.

(21) Appl. No.: 12/308,814

(22) PCT Filed: Jun. 28, 2007

(86) PCT No.: PCT/FR2007/051547
§ 371 (c)(1),
(2), (4) Date: Oct. 2, 2009

(87) PCT Pub. No.: WO2008/001014
PCT Pub. Date: Jan. 3, 2008

(65) Prior Publication Data
US 2010/0084153 A1    Apr. 8, 2010

(30) Foreign Application Priority Data

Jun. 29, 2006  (FR) .................................. 06 52704

(51) Int. Cl.
*H01B 12/00*  (2006.01)
*H01B 7/00*   (2006.01)
*H01B 9/00*   (2006.01)
*H01B 11/00*  (2006.01)
*F17C 3/08*   (2006.01)

(52) U.S. Cl. .......... 174/24; 174/15.4; 174/15.5; 62/45.1

(58) Field of Classification Search ................ 174/15.4, 174/15.5, 24, 73.1; 505/163; 62/45.1; 16/2.1
See application file for complete search history.

(56) References Cited

U.S. PATENT DOCUMENTS

| | | | | |
|---|---|---|---|---|
| 3,885,636 A * | 5/1975 | Hildebrandt | ................. | 174/15.5 |
| 4,485,266 A * | 11/1984 | Minati et al. | ................. | 174/15.4 |
| 5,440,888 A | 8/1995 | Cottevielle | .................... | 62/50.7 |
| 6,333,462 B1 * | 12/2001 | Quaggia | .................... | 174/74 R |
| 2003/0154727 A1 | 8/2003 | Ashibe | ......................... | 62/45.1 |
| 2004/0211586 A1 * | 10/2004 | Sinha et al. | ................ | 174/125.1 |
| 2006/0011377 A1 * | 1/2006 | Schmidt et al. | ............ | 174/125.1 |

OTHER PUBLICATIONS

International Search Report dated Oct. 22, 2007.

* cited by examiner

*Primary Examiner* — Timothy Thompson
*Assistant Examiner* — Roshin Varghese
(74) *Attorney, Agent, or Firm* — Sofer & Haroun, LLP

(57) ABSTRACT

An electrical bushing structure includes a central conductor (19) designed to have one (26) of its two ends connected to a superconductor element situated in an enclosure (11) at cryogenic temperature, and its other end (25) connected to an article at ambient temperature. An electrically insulating sheath (20) surrounds the conductor over substantially the entire length of the conductor. A metal tube (24) surrounds the conductor over substantially its entire length and is interposed between the insulating sheath (20) and the conductor (19), the tube being mechanically fastened to the conductor close to one of the ends (25, 26) of the conductor, referred to as its first end, and not being mechanically fastened to the conductor close to the other one of the ends of the conductor, referred to as its second end. A space between the conductor and the tube containing a gas. The tube is in electrical contact with said second end of the conductor.

15 Claims, 2 Drawing Sheets

ELECTRICAL FEEDTHROUGH STRUCTURE FOR SUPERCONDUCTOR ELEMENT

RELATED APPLICATIONS

This application is a National Phase Application of PCT Patent Application no. PCT/FR2007/051547, filed on Jun. 28, 2007, which claims priority to French Patent Application No. 06-52704, filed on Jun. 29, 2006, the entirety of which are incorporated by

FIELD OF THE INVENTION

The present invention relates to an electrical bushing structure for a superconductor element, such as a cable conveying electricity at medium or high voltage. The structure serves to make a connection between a superconductor element at cryogenic temperature at one end and an article at ambient temperature at the other end, e.g. a non-superconductor cable or a piece of equipment, usually in the open air.

BACKGROUND

Because of the large temperature difference between the superconductor element and the article that is to be connected thereto, i.e. between cryogenic temperature, which may be about −200° C., and ambient temperature, it is necessary to interpose a connection structure between the superconductor element and the article in order to make the temperature transition while minimizing heat flows, and while nevertheless complying with electrical constraints, e.g. due to the high voltage when a cable is involved. This structure includes an electrical bushing made up mainly of a central conductor surrounded by an insulating sheath for conveying electricity from the superconductor cable to an outlet connection at ambient temperature. Over a reasonable length, this structure needs to achieve the temperature transition while ensuring that losses due to heat conduction along the electrical bushing are small, so as to avoid boiling the cryogenic liquid that cools the cable.

Another technical problem that needs to be solved is properly distributing the electric field created by the medium or high voltage of the central conductor of the electrical bushing so as to avoid electric arcs or "breakdowns".

The central conductor of the bushing is constituted by a cylindrical metal conductor of diameter that is large enough to enable high electric currents to be conveyed. For example, for currents of the order of several thousands of amps, the diameter of the central conductor may be of the order of 50 millimeters (mm) to 70 mm. The voltage is usually high, e.g. 100,000 volts (V), so the sheath surrounding the central conductor must be a good insulator in order to avoid breakdowns occurring, and this must apply over the entire length of the bushing structure, which may be several meters long.

The temperature differences along the bushing lead to a problem of conserving good electrical insulation for the sheath surrounding the central conductor. The materials constituting the conductor (e.g. aluminum or copper) and the sheath (e.g. epoxy) have different thermal conductivities, and that can give rise to stresses at the interface between the conductor and the sheath. Thus, a large amount of heat flowing along the bushing can lead locally to a high temperature gradient between the sheath and the conductor, and that can cause the sheath to crack and thereby destroy its insulating power to a large extent. In addition, the difference between the coefficients of thermal expansion of the materials constituting the conductor and the sheath can lead to mechanical stresses between the sheath and the conductor, and thus to cracking of the sheath.

In order to avoid such cracking occurring, one known technique consists in selecting the materials for constituting the sheath and the central conductor in such a manner that their coefficients of thermal expansion are substantially identical. For example, certain specific aluminum alloy compositions and certain epoxy resins have coefficients of thermal expansion that are very close, with a difference that may be about $5 \times 10^{-6}$ per kelvin. That technique serves to limit the risk of cracks forming, but it does not eliminate the risk completely since it is very difficult, if not practically impossible, to find a material that is a good conductor of electricity and another material that is an insulator, both having the same thermal behavior, and in particular both the same coefficient of thermal expansion and the same thermal conductivity. Furthermore, both materials must be capable of withstanding without damage temperature variations over the range about −200° C. to ambient temperature.

European patent application EP 1 283 576 A1 describes an electrical bushing structure of the type comprising:
  a central conductor designed to have one of its two ends connected to a superconductor element situated in an enclosure at cryogenic temperature, and its other end connected to an article at ambient temperature;
  an electrically insulating sheath surrounding the conductor over substantially the entire length of the conductor; and
  a metal tube surrounding the conductor over substantially its entire length and interposed between the insulating sheath and the conductor, the tube being mechanically fastened to the conductor close the end of the conductor that is connected to the superconductor element and not being mechanically fastened to the conductor close to the end of the conductor that is connected to the article at ambient temperature.

Nevertheless, the tube is made of stainless steel, which is a poor conductor and it does not have any electrical function since it is connected at only one end. All of the current conveyed from the superconductor element to the article at ambient temperature is carried by the conductor.

This results in a loss of working section for conveying current along the bushing and leads to a major risk of heating and of losses via the bushing.

OBJECTS AND SUMMARY

The invention solves this problem by proposing an electrical bushing structure of the type comprising:
  a central conductor designed to have one of its two ends connected to a superconductor element situated in an enclosure at cryogenic temperature, and its other end connected to an article at ambient temperature; and
  an electrically insulating sheath surrounding the conductor over substantially the entire length of the conductor;
  a metal tube surrounding the conductor over substantially its entire length and being interposed between the insulating sheath and the conductor, the tube being mechanically fastened to the conductor close to one of the ends of the conductor, referred to as its first end, and not being mechanically fastened to the conductor close to the other one of the ends of the conductor, referred to as its second end;
  a space between said conductor and said tube containing a gas;
which structure is characterized in that the tube is in electrical contact with said second end of the conductor.

The present invention thus proposes an improved electrical bushing structure that both solves the problems associated with differences in coefficients of expansion and thermal conductivity between the materials constituting the sheath and the central conductor and also improves the ability of the bushing to convey current while limiting problems of sealing the space between the conductor and the tube.

In a preferred embodiment, said second end is the end for connection to the superconductor element.

Said gas is a non-controlled gas, preferably air or nitrogen.

According to the above-mentioned prior art document, the structure of the bushing may include a central conductor surrounded by a space in which a vacuum is established or that is filled with helium that does not liquefy at the cryogenic temperature. The evacuated or helium-filled space extends from the portion at cryogenic temperature to the portion at ambient temperature. The drawback of that configuration lies in the need for good sealing of the bushing structure, thereby leading to manufacturing constraints that are difficult and expensive. There must be no communication between the space surrounding the central conductor and the other portions of the bushing:

at the top end in order to conserve the vacuum or the helium in said space, a leak in the top portion with the medium at ambient temperature destroying this controlled atmosphere; and in the bottom portion in order to avoid any cryogenic fluid penetrating into said space and likewise destroying the controlled atmosphere.

The mechanical fastening between said conductor and said tube at said first end of the conductor is preferably covered by said insulating sheath. This covering is made during fabrication of the bushing and ensures good sealing of said space at this level.

The tube is made of a material that is a good conductor of electricity and preferably of aluminum alloy or of copper which are excellent conductors of electricity.

Advantageously, the insulating sheath is made of epoxy resin.

Preferably, the coefficient of thermal expansion of the metal constituting the tube is close to the coefficient of thermal expansion of the material constituting the insulating sheath.

Metal blades may be interposed between the tube and the conductor close to the end of the tube that is not mechanically fastened to the conductor (preferably close to the end of the conductor for connection to said article at ambient temperature), the blades providing electrical contact between the tube and the conductor.

In an advantageous embodiment, the structure further includes an electrically conductive screen surrounding the insulating sheath, in contact therewith over at least a fraction of the sheath extending from the end of the bushing in contact with the enclosure at cryogenic temperature up to a position along the sheath at which the temperature is intermediate between cryogenic temperature and ambient temperature. When a stress cone surrounds the sheath, the screen preferably extends up to the cone.

BRIEF DESCRIPTION OF THE DRAWINGS

Other advantages and characteristics of the invention appear from the following description of an embodiment of the invention, given by way of non-limiting examples and with reference to the accompanying drawings, in which.

DETAILED DESCRIPTION

Figure 1:
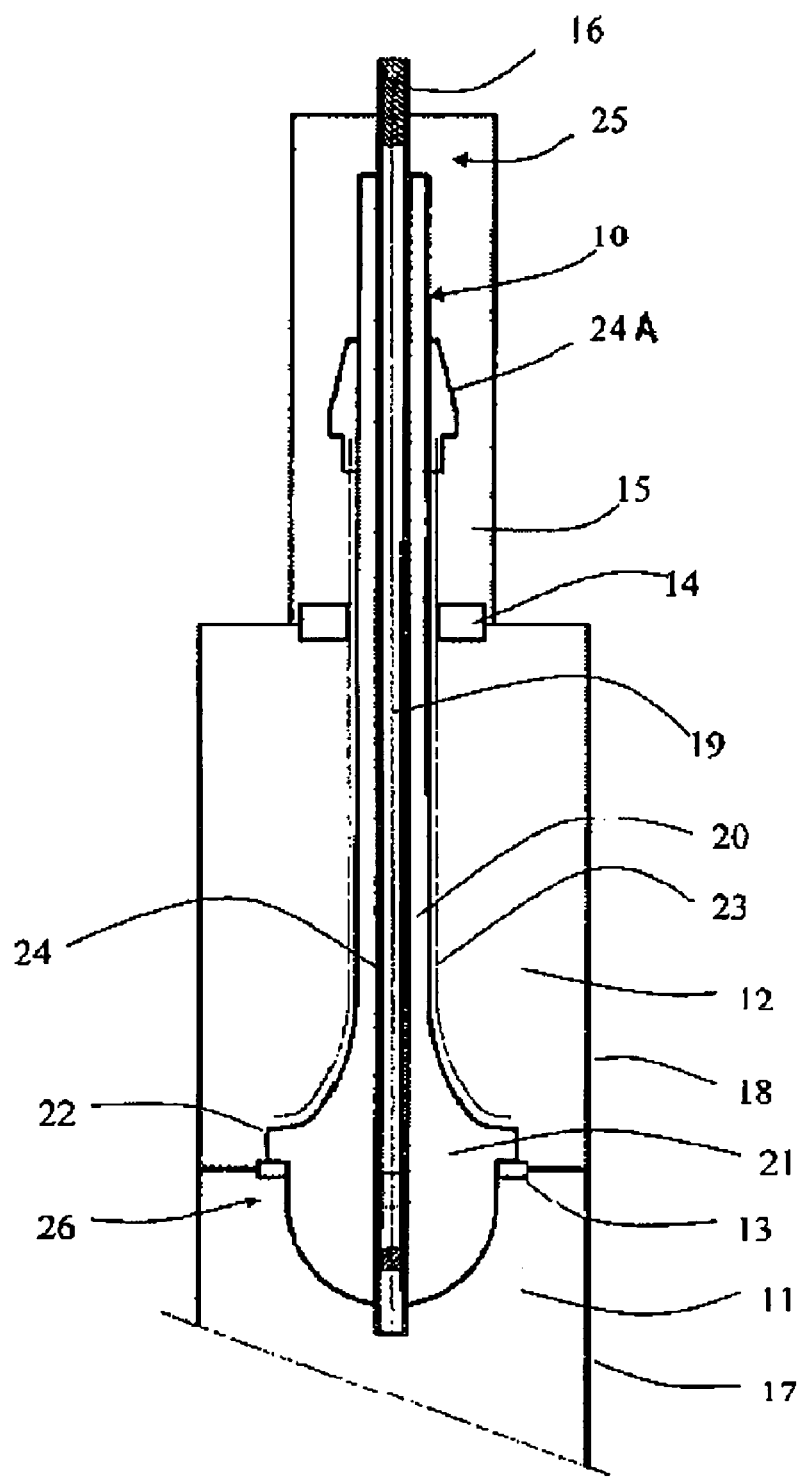
FIG. 1 is a diagram of an embodiment of the invention.

In FIG. 1, the structure for connection to a superconductor element such as a cable (not shown), comprises an electrical bushing 10 connected to the superconductor element via its bottom end situated in an enclosure 11 at cryogenic temperature. An intermediate enclosure 12, adjacent to the cryogenic enclosure 11, is preferably filled with a solid material of low thermal conductivity. By way of example, this material may be in the form of a foam, such as a polyurethane foam or a cellular glass foam. The electrical bushing 10 passes through the bottom wall of the intermediate enclosure 11 via a leaktight fastener flange 13 and passes through the top wall via a leaktight fastener flange 14. Where it leaves the intermediate enclosure 12, the electrical bushing 10 extends inside an ambient temperature enclosure 15 that terminates in means 16 for electrically connecting the bushing, and thus the superconductor element, to an appropriate device, piece of equipment, or article. The intermediate enclosure is thus at a temperature that lies between the temperature of the cryogenic fluid and ambient temperature. The walls 17 and 18, respectively of the cryogenic temperature enclosure 11 and of the intermediate enclosure 12, form cryostat walls to achieve good thermal insulation. Since the intermediate enclosure is leaktight, it is preferably fitted with a safety valve (not shown) in order to vent any excess pressure that might arise in the event of a leak past the flange 13.

The electrical bushing 10 has a metal central conductor 19 that is preferably made of an aluminum alloy or of copper and it is in the form of a solid cylinder. It is surrounded over substantially its entire length in an electrically insulating sheath 20, e.g. made of epoxy. At its bottom end, the insulating sheath 20 is terminated by a bulb 21 that includes a fastener collar 22. The portion of the bulb that is situated above the collar 22 is preferably of flaring shape, with the portion that is flared the most being level with the collar. This flared shape serves to lengthen the creepage distance between ground and high voltage, thereby reducing the risk of electrical breakdown at the bottom end of the bushing. The bulb 21 is fastened in leaktight manner via the flange 13 to the inside wall of the cryogenic temperature enclosure 11.

An electrically conductive screen 23, preferably made of metal, surrounds the insulating sheath over at least a fraction thereof, i.e. over a certain length. The presence of this screen is useful but not essential. It is made for example by metal plating the insulating sheath over said fraction, which extends from the portion of the intermediate enclosure in contact with cryogenic temperature at least as far as the flange 14, i.e. the junction between the intermediate enclosure 12 and the ambient temperature enclosure 15. The screen 23 is electrically connected to a fixed potential, preferably ground potential. Its function is to confine the electric field along the conductor within the electrical bushing only, and more precisely between the central conductor and the screen.

A stress cone 24A situated in the ambient temperature enclosure 15 surrounds the sheath 20 of the electrical bushing 10. The conductive portion of the stress cone is electrically connected to the screen 23, and also to the electrically conductive leaktight fastener flange 14. The screen 23 may stop level with the fastener flange 14 and may be connected electrically to the conductive portion of the stress cone, e.g. with the help of a semiconductive tape wound around the sheath 20. Alternatively, the screen may be extended directly as far as the conductive portion of the stress cone. The function of the stress cone is to deflect or spread the electric field lines where the metal plating comes to an end so as to avoid any discontinuity that could lead to an electric breakdown.

The electrical bushing 10 is terminated outside the ambient temperature enclosure 15 by a connection terminal for supplying the superconductor cable with electricity at medium or high voltage or for feeding equipment at ambient temperature with electricity at medium or high voltage coming from the superconductor cable.

According to the invention, a thin-walled metal tube 24 is inserted between the central conductor 19 and the insulting sheath 20 over practically the entire length of the central conductor, leaving a space between the conductor and the tube, which space contains a non-controlled gas, preferably air or nitrogen. The metal tube 24 is fastened to the central conductor at one point only along the conductor, close to one of the two ends 25 and 26 of the central conductor 19 (the end 25 being the end that is close to ambient temperature and the end 26 being the end that is close to cryogenic temperature). The tube 24 is preferably fastened to the conductor 19 at the end 26 that is close to cryogenic temperature, and the mechanical fastening between the conductor and the tube at said end of the conductor is covered by said insulating sheath. The mechanical fastening may be implemented by welding, for example.

Figure 2:
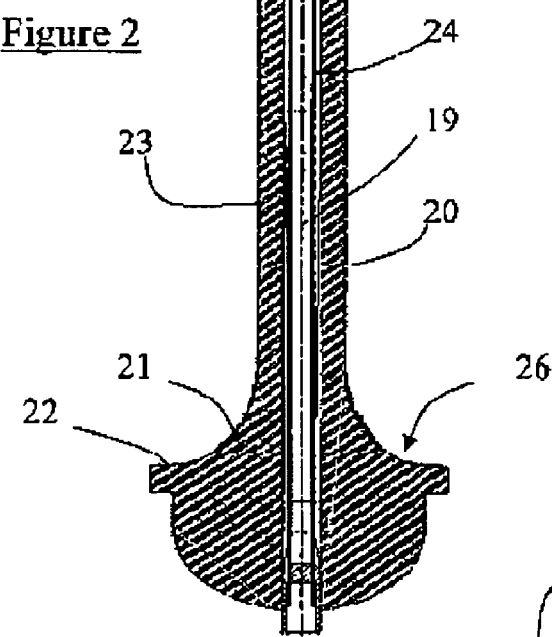
FIGS. 2 to 5 are longitudinal and cross sections of elements of the structure shown in FIG. 1.
Figure 5:
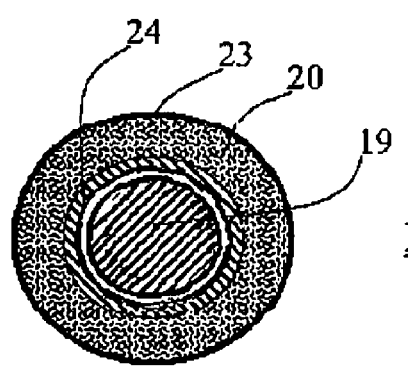

FIGS. 2 and 5 show the structure of the bushing, respectively in longitudinal section and in cross-section on plane AA of FIG. 2, in which there can be seen successively going from the center: the central conductor 19; the thin-walled tube 24; the electrically insulating sheath 20 having one of its ends forming the bulb 21; and the screen 23. The thin-walled metal tube 24 is preferably made of the same metal as the central conductor, e.g. of aluminum alloy or of copper. Naturally, the materials constituting the sheath and thin-walled tube are connected so that their coefficients of thermal expansion are close to each other. The central conductor, the metal tube, the insulating sheath, and the screen are concentric, the conductor being in contact with the tube, the tube being in contact with the sheath, and the sheath being in contact with the screen. In order to fabricate the bushing, the thin-walled tube 24 is initially fastened to the central conductor 19, then the insulating sheath 20 is molded around the tube, thus ensuring good sealing relative to the cryogenic fluid. By way of example, the diameter of the central conductor may be of the order of 50 mm to 70 mm, while the wall thickness of the thin-walled tube 24 may lie in the range 0.5 mm to 3 mm, and preferably in the range 1 mm to 2 mm, with the space between the conductor and the tube being of millimeter order. The relatively large section of the central conductor serves to avoid excessive losses and heating by the Joule effect. The thickness of the insulating sheath is much greater than that of the thin-walled tube, e.g. lying in the range 20 mm to 50 mm in the cylindrical portion of the sheath, away from the bulb 21.

Figure 3:
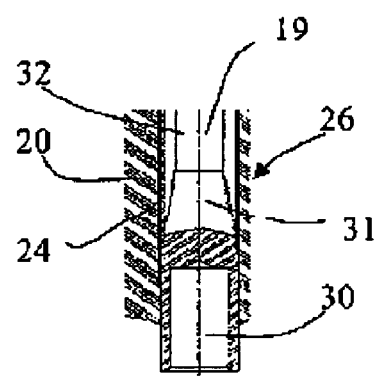

In the embodiment shown, the section of the central conductor at the end 26 situated in the cryogenic enclosure, level with the bulb 21, is slightly smaller than the uniform section of the central conductor, so as to limit the flow of heat along the conductor. In FIG. 3, the end 26 of the conductor 19 comprises a portion 30 in the form of a female connector enabling the superconductor element to be connected to the central conductor, a portion 31 of frustoconical shape of diameter that tapers going towards the top of the bushing at ambient temperature, and then a frustoconical portion 32 of diameter that flares until it reaches the constant diameter of the conductor. Naturally, in another embodiment, the central conductor 19 could be of constant diameter along its entire length. The thin-walled tube 24 is welded to the central conductor at the connector 30.

Figure 4:
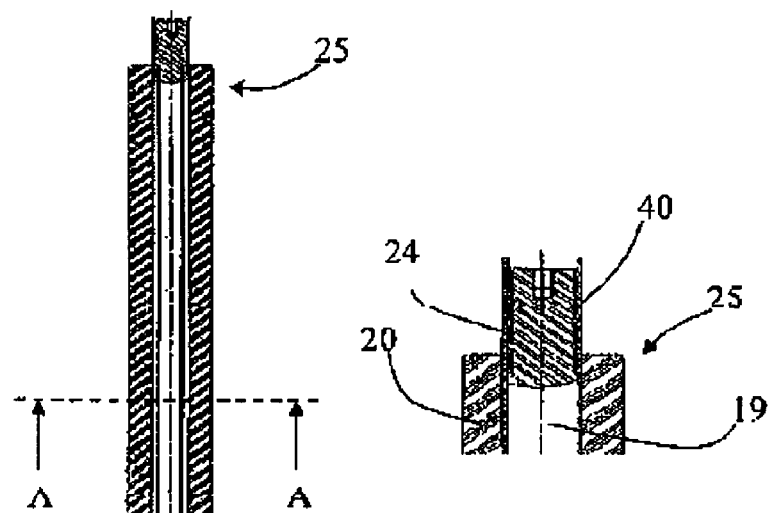

FIG. 4 is a longitudinal section through the end 25 of the bushing that is situated at ambient temperature. The central conductor 19 and the thin-walled tube 24 are not mechanically secured to each other and they can therefore expand and contract independently of each other. Nevertheless, the tube and the conductor are electrically interconnected by moving electrical contact means situated between the tube and the conductor. For this purpose, electrically conductive flexible blades 40 are interposed between the tube and the conductor, in contact both with the tube and the conductor. In general, these electrical contact means are situated at the end of the thin tube that is not fastened to the conductor. Nevertheless, since the fastening between the central conductor and the tube is preferably located at the end 26 of the bushing, the electrical contact means are preferably situated at the end 25 that is situated at ambient temperature.

The metal thin-walled tube 24 serves to obtain good thermal equilibrium at the interface between the tube 24 and the insulating sheath 20 because of the small wall thickness of the tube, and thus because of the small quantity of conductive material that is in contact with the much-larger quantity of insulating material of the sheath. The temperature gradient at the tube/sheath interface is therefore much smaller than in prior art devices. In addition, even with the bushing being cooled down or heated up quickly, heat flows mainly along the central conductor, with very little flowing in the tube. The structure of the bushing is therefore less sensitive to rapid changes in temperature. Similarly, the positive or negative expansion due to temperature variations mainly affects the central conductor because of its mass. Since the tube is mechanically fastened to the conductor at one location only, mechanical stresses at the tube/sheath interface are reduced since there is no thermal coupling between the tube and the central conductor. Nevertheless, the central conductor 19 and the tube 24 are electrically connected together, so they are at the same electrical potential, and there are no electric field disparities, with electric field lines remaining channeled between the sheath and the assembly comprising the tube and the central conductor.

Embodiments other than that described and shown can be devised by the person skilled in the art without going beyond the ambit of the present invention.

The invention claimed is:

1. An electrical bushing structure comprising:
    central conductor designed to have one of its two ends connected to a superconductor element situated in an enclosure at cryogenic temperature, and its other end connected to an article at ambient temperature;
    an electrically insulating sheath surrounding the conductor over substantially the entire length of the conductor;
    metal tube surrounding the conductor over substantially its entire length and being interposed between the insulating sheath and the conductor, the tube being mechanically fastened to the conductor close to one of the ends of the conductor, referred to as its first end, and not being mechanically fastened to the conductor close to the other one of the ends of the conductor, referred to as its second end; and
    a space between said conductor and said tube containing a gas, wherein
    the tube is in electrical contact with said second end of the conductor.

2. An electrical bushing structure according to claim 1, wherein said first end of the conductor is its end for connection to the superconductor element.

3. An electrical bushing structure according to claim 2, wherein the mechanical fastening between said conductor and said tube at said first end of the conductor is covered by said insulating sheath.

4. A structure according to claim 1, wherein said gas is air or nitrogen.

5. An electrical bushing structure according to claim 1, wherein the tube is made of an aluminum alloy or of copper.

6. An electrical bushing structure according to claim 1, wherein the insulating sheath is made of epoxy resin.

7. An electrical bushing structure according to claim 1, wherein the coefficient of thermal expansion of the metal constituting the tube is close to the coefficient of thermal expansion of the material constituting the insulating sheath.

8. An electrical bushing structure according to claim 1, wherein flexible metal blades are interposed between the tube and the conductor close to the end of the tube that is not mechanically fastened to the conductor, the blades providing electrical contact between the tube and the conductor.

9. An electrical bushing structure according to claim 8, wherein the metal blades are interposed between the tube and the conductor close to the end of the conductor that is to be connected to said article.

10. An electrical bushing structure according to claim 9, wherein a stress cone is fastened around the sheath, the conductive screen extending from the end of the bushing that is in contact with the enclosure at cryogenic temperature up to the stress cone.

11. An electrical bushing structure according to claim 1, wherein the wall thickness of the tube lies in the range 0.5 mm to 3 mm.

12. An electrical bushing structure according to claim 1, wherein an electrically conductive screen surrounds the insulating sheath, in contact therewith, over at least a fraction of the sheath extending from the end of the bushing in contact with the enclosure of cryogenic temperature to a position along the sheath at a temperature that is intermediate between cryogenic temperature and ambient temperature.

13. An electrical bushing structure according to claim 12, wherein said portion of the central conductor is substantially frustoconical in shape.

14. An electrical bushing structure according to claim 1, wherein the central conductor is of substantially uniform section, with the exception of the section of the portion of the central conductor situated close to the cryogenic enclosure, the section of said portion being smaller than said substantially uniform section.

15. An electrical bushing structure according to claim 1, wherein the wall thickness of the tube lies in the range 1 mm to 2 mm.

* * * * *